July 10, 1956  H. R. TEAR  2,753,953
COALESCING FITTING
Filed April 26, 1954

Inventor
Harry R. Tear
By Ahlberg, Nupper & Gradolph
Attys.

United States Patent Office 2,753,953
Patented July 10, 1956

2,753,953
COALESCING FITTING

Harry R. Tear, Evanston, Ill., assignor to Stewart-Warner Corporation, Chicago, Ill., a corporation of Virginia Application April 26, 1954, Serial No. 425,599

2 Claims. (Cl. 183—75)

The present invention relates generally to coalescing fittings for use in centralized lubricating systems, in which the oil is conveyed to the bearings as an aerosol.

In oil aerosol lubricating systems, it is usually desirable that the oil in the aerosol conveyed to the bearing or other part to be lubricated shall be coalesced at or near the bearing so that it will flow to a bearing as a liquid and not escape to the atmosphere with the air by which it was conveyed to the bearing. Lubricating apparatus of this type is disclosed in the patents to Gothberg et al. Nos. 2,610,700 and 2,642,156, the latter patent disclosing several forms of coalescing, or oil precipitating, fittings.

It is the object of the invention to provide an improved coalescing fitting which will operate more efficiently and which may be manufactured at a low cost.

Figure 1:
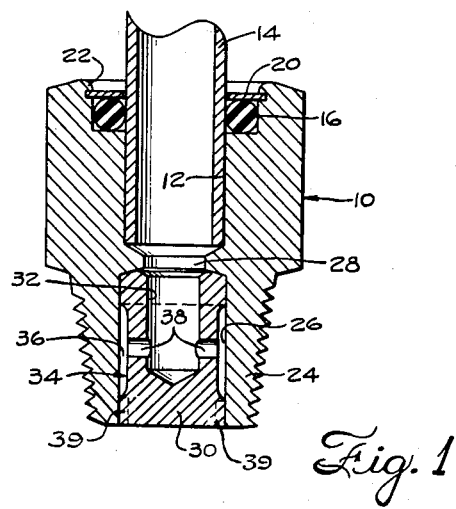
Figure 2:
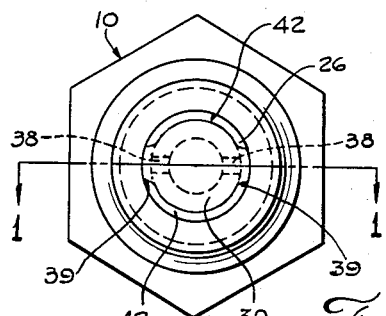

Other objects will become apparent from the following description, reference being had to the accompanying drawings, in which Fig. 1 is a central vertical sectional view of the improved fitting, shown to an enlarged scale; and Fig. 2 is a bottom plan view thereof.

The fitting comprises a body 10 preferably hexagonal in shape, having a central axial bore 12 for the reception of an oil aerosol inlet conduit 14 which is of relatively large diameter. A suitable toroidal sealing ring 16 made of a suitable synthetic rubber which is not deleteriously affected by contact with oil, is held in a short counterbore 18 by an anchoring washer 20, the latter being held in place by annular staking 22.

The body has a threaded shank 24 for connection to a bearing or other part to be lubricated. This shank or sleeve 24 has a bore 26 which communicates with the bore 12 through an opening 28. A plug or nozzle member 30 has a press fit in the bore 26 and is provided with a central axial bore 32 which terminates short of the outer end of the plug. The central portion of the plug 30 defines an exterior cylindrical surface 34 which, together with the cylindrical wall of the bore 26, provides an annular or arcuate chamber 36 of generally cylindrical shape. The space within the bore 32 is in communication with the annular space 36 through a pair of small diameter radial ports or bores 38. The outer end of the plug 30 has a pair of centering lugs 39 of small circumferential extent, Fig. 2, engaging the interior cylindrical surface of the bore 26. Between the lugs 39 the adjacent extreme ends of the sleeve 24 and the plug 30 are shaped and dimensioned by axial continuations of the opposing cylindrical surfaces 26 and 34 to define a pair of outlet openings 42 of relatively large aggregate area substantially equal to the area of the annular space 36 transverse to the axis thereof.

In the operation of this fitting an oil aerosol is supplied through the conduit 14 of relatively large cross sectional area and into the bore 32 of the plug 30. The velocity of flow through the conduit 14 and the bore 38 is sufficiently low that the oil remains in the form of an aerosol, the particles being a few microns in diameter, but as the aerosol is discharged through the small diameter ports 38 and strikes the wall of the bore 26, the oil particles will have attained sufficient velocity that their kinetic energy, or momentum, is great enough to overcome the surface tension which tends to retain the particles in spherical form. The particles thus "wet" the wall, forming a thin film of oil thereon, which flows to the bearing due to the friction of the air on the film, and if the fitting happens to have been installed in the vertical position shown, this frictional force will be assisted by gravity.

The air, after striking the wall of the bore 26, is deflected in both directions along the wall of the bore 26, and flows downwardly to the outlet openings 42.

The fitting is of such simple construction that it may be assembled by automatic machinery. The capacity of the fitting may be increased by providing additional ports 38. It has been found to be very efficient in coalescing oil particles from an oil aerosol.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A compact lubricating fitting for connection to a lubricating oil aerosol conduit to coalesce oil particles from the aerosol and direct the collected oil axially from the fitting, comprising, in combination, a body having an inlet end and an outlet end and defining a central passage extending therethrough between said ends thereof, the portion of said passage adjacent said outlet end of the body forming a cylindrical bore section of substantial length extending with undiminished size to the extreme outlet end of the body, said body being shaped at said inlet end thereof to connect the adjacent end of said passage to an oil aerosol supply conduit, a cylindrical plug element of substantial length disposed in said bore section of said passage, the end of said plug element opposite the outlet end of said body forming a tight circumferentially sealed connection with the adjacent portion of said body encircling said passage, an axial portion of said plug element of substantial length extending to the extreme end of the element adjacent said body outlet end being dimensioned with respect to the opposing portion of said bore section of said passage to define therewith arcuate space of generally cylindrical shape substantially encircling the plug element and extending axially therealong to the extreme outlet end of said body, the outlet end of said body and the adjacent end of said plug element being shaped and dimensioned relative to each other to define unrestricted discharge area opening outwardly from said cylindrically shaped arcuate space and having a minimum size transverse to the axis of said plug at least substantially equal to the flow area of said arcuate space transverse to the axis thereof, said plug element defining an axial bore therein closed at the end thereof adjacent the outlet end of said body and opening through the opposite end of the plug element to connect with and form a part of said passage extending from the inlet end of said body, and said plug element defining at least one radial bore therein aligned along the axis of the plug element with a medial portion of said arcuate space therearound and extending between the latter and said axial plug bore; said radial bore having a transverse area of only a small fraction of that of any one of said axial plug bores, said arcuate space, and said discharge area whereby substantially the entire pressure drop through the fitting is applied as a presure differential across said radial plug bore to effect a high acceleration of aerosol passing therethrough to said arcuate space; the axial portion of said arcuate space aligned with said radial plug bore being restricted to a radial dimension of only a small fraction of the diameter of said plug element to cause the aerosol accelerated in said radial plug bore to impinge with maximum impulse on the adjacent surface of bore section of said body passage.

2. A compact lubricating fitting for connection to a lubricating oil aerosol conduit to coalesce oil particles from the aerosol with high efficiency and direct the oil collected axially from the fitting, comprising, in combination, a nozzle member defining an axial bore therein open at one end thereof and extending only part-way therethrough, means having a fluidtight juncture with said nozzle member around said bore and being adapted to form a sealed connection between the open end of said bore and an aerosol supply conduit, said nozzle member defining an exterior cylindrical surface thereon substantially continuous circumferentially therearound and having an axis generally parallel to that of said bore, said exterior nozzle member surface extending along said nozzle member from the extreme end thereof opposite the open end of said bore to axially overlap said bore to a considerable extent, said nozzle member defining at least one radial bore therein extending from said axial bore therein through said exterior cylindrical surface thereon, sleeve means having a circumferential fluid-tight juncture with said nozzle member around said axial bore therein and defining an interior cylindrical surface substantially concentric with said exterior cylindrical surface on said nozzle member and extending therealong to the end thereof opposite the open end of said nozzle member axial bore, said interior cylindrical surface of said sleeve means having a diameter only slightly greater than that of said nozzle member exterior surface to define with the latter an arcuate space of generally cylindrical shape having a radial thickness of only a small fraction of the diameter of said nozzle member cylindrical surface, and the end of said nozzle member opposite said open end of said axial bore therein and the adjacent end of said sleeve means being shaped and dimensioned relative to each other to define an unrestricted discharge area opening outwardly from said cylindrically shaped arcuate space and having a minimum transverse flow area at least equal to the flow area of said arcuate space transverse to the axis thereof; the transverse flow areas of said axial bore, said arcuate space, and said discharge area transverse to the respective axes thereof each being many times larger than the flow area of said radial bore transverse to the axis thereof to concentrate the overall pressure drop through the fitting as a pressure differential across said radial bore.

References Cited in the file of this patent

UNITED STATES PATENTS

| | | |
|---|---|---|
| 2,043,944 | Baker et al. | June 9, 1936 |
| 2,211,422 | Hettinger | Aug. 13, 1940 |
| 2,590,217 | Snyder et al. | Mar. 25, 1952 |
| 2,610,700 | Gothberg | Sept. 16, 1952 |
| 2,642,156 | Gothberg et al. | June 16, 1953 |